Dec. 20, 1966  E. L. LUSTENADER  3,293,153
METHOD AND APPARATUS FOR DIFFUSION DISTILLATION
Filed Dec. 11, 1961  2 Sheets-Sheet 1

Inventor
Edward L. Lustenader
by Alfred J. Hutter
His Attorney

Dec. 20, 1966 E. L. LUSTENADER 3,293,153
METHOD AND APPARATUS FOR DIFFUSION DISTILLATION
Filed Dec. 11, 1961 2 Sheets-Sheet 2
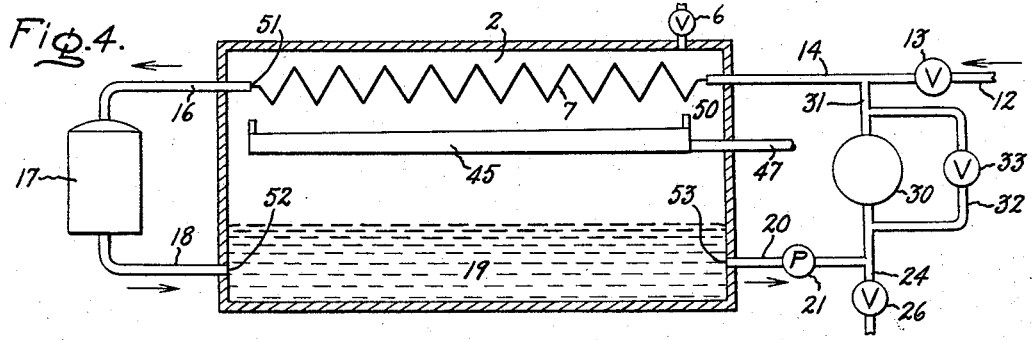
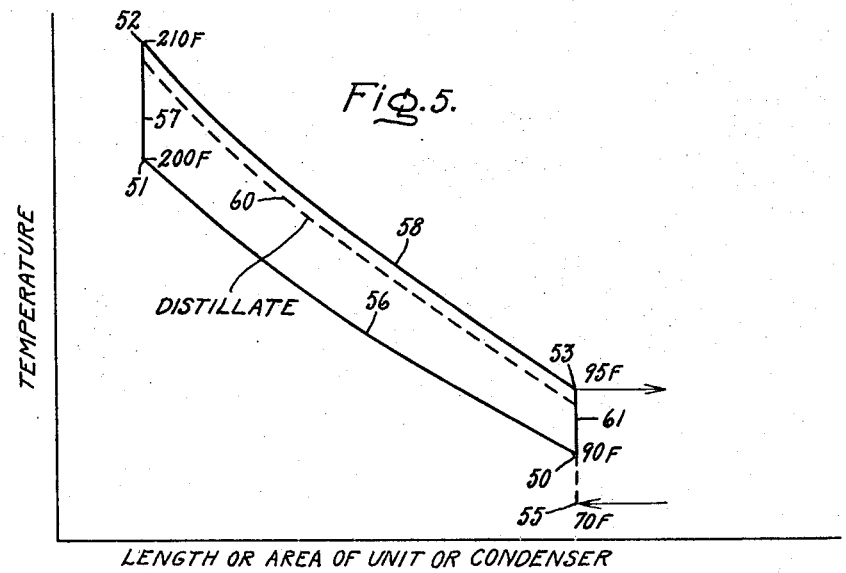
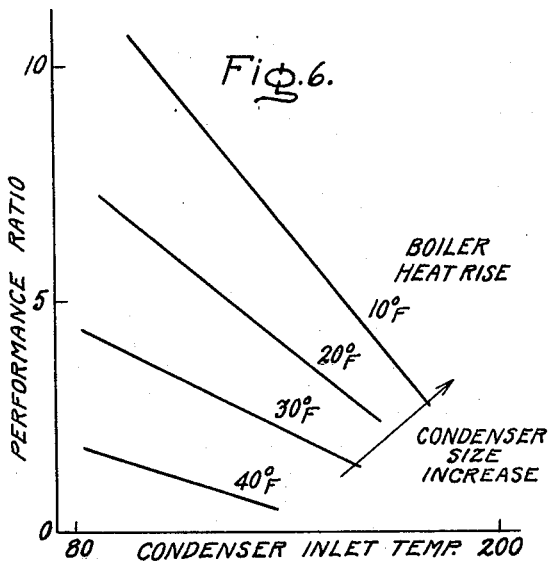
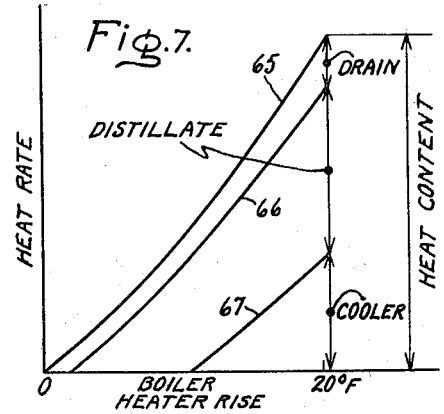
Inventor
Edward L. Lustenader
by Alfred G. Hutter
His Attorney

United States Patent Office 3,293,153
Patented Dec. 20, 1966

3,293,153
METHOD AND APPARATUS FOR DIFFUSION
DISTILLATION
Edward L. Lustenader, Scotia, N.Y., assignor to General
Electric Company, a corporation of New York
Filed Dec. 11, 1961, Ser. No. 158,424
7 Claims. (Cl. 203—11)

This application is a continuation-in-part of my copending application entitled, "Water Demineralizing Apparatus," Serial No. 98,842, filed March 28, 1961, now Patent No. 3,196,087.

The present invention relates to a method and apparatus for distillation and, more particularly, to a method and apparatus for demineralizing water for use in household water softening devices.

In my copending application it is recognized that the most common types of apparatus available for treating water for household use at the present time are usually directed to chemically removing certain selected salts, such as calcium carbonate and magnesium carbonate, from hard water. My application further recognizes the limited usefulness of such apparatus because of the selective nature of their action and their limited ability to decrease the impurity level of the water being treated.

Desirably, the action of this type of apparatus should be sufficiently comprehensive to include the rendering of brackish and saline water potable. The success of the apparatus is also based on economic considerations, accordingly, the apparatus should have reasonable initial and operating costs.

In my copending application there is disclosed an apparatus for evaporating distilland wherein the apparatus includes a pair of spaced surfaces maintained at different temperatures and including a movable surface, preferably, a rotatable disk which passes through a sump filled with heated distilland. The disk moves in close proximity to a cooler surface whereby a portion of the distilland on the disk surface evaporates diffusing to and condensing on the cooler surface from whence the liquid is collected for use. My present application is directed to an apparatus utilizing the diffusion distillation principle in a manner to achieve more economic operation making this type of apparatus more feasible for household use.

The chief object of the present invention is to provide an improved method and apparatus for rendering saline and brackish water potable.

An object of the invention is to provide an improved method and apparatus for distillation which is not harmfully affected by scaling and which operates economically.

Another object of the invention is to provide an improved household water softening device.

A still further object of the invention is to provide an improved method and apparatus for demineralizing water wherein evaporation and condensation may occur at atmospheric pressure and in the presence of noncondensible gases.

These and other objects of my invention will become more apparent from the following description.

Briefly stated, the present invention relates to a method and apparatus for diffusion distillation wherein distilland may be initially supplied to a condenser located in a chamber containing a non-condensible gas. The distilland which passes from the condenser may be heated before being passed adjacent the condenser in counterflow relation to the distilland flowing through the condenser whereby through a process of heat exchange, a portion of the distilland evaporates and diffuses through the noncondensible gas in the chamber and condenses on the condenser where it is collected for use.

The attached drawings illustrate a preferred embodiment of my invention in which:

FIGURE 4 is a diagrammatic view illustrating the invention;

FIGURE 5 is a diagram plotting distilland temperature versus the length of the condenser illustrating the cycle being utilized in the apparatus in FIGURE 4;

FIGURE 6 is a diagram plotting performance ratio versus condenser inlet temperature for various boiler heat disks in the apparatus shown in FIGURES 1-4; and FIGURE 7 is a diagram plotting heat rate versus boiler temperature rise illustrating the heat balance for the apparatus shown in FIGURES 1-4.

Figure 1:
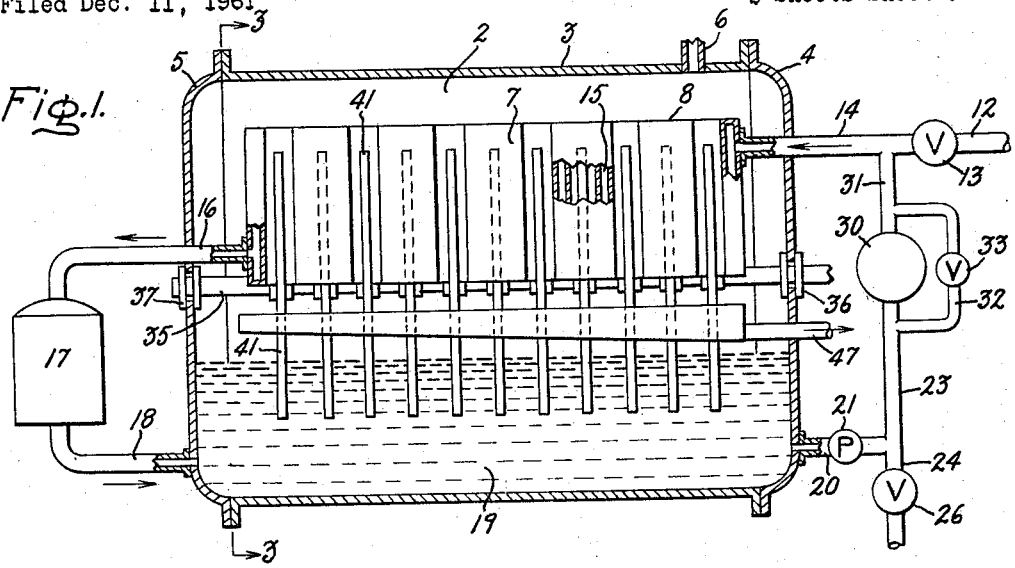
FIGURE 1 is a partially diagrammatic sectional view, in elevation, illustrating an apparatus employing the present invention.

Referring now to the drawings in more detail, there is shown in FIGURE 1 a view in elevation, partially in section and partially diagrammatic, of an apparatus for practicing the present invention. The apparatus comprises chamber 2 defined by a cylindrical shell 3 provided with suitable end flanges adapted to engage and be bolted to the flanges of end members 4 and 5. In this embodiment, the central cylindrical shell portion 3 is provided with line 6 which may vent the chamber to the atmosphere for a purpose more fully described hereinafter.

Figure 2:
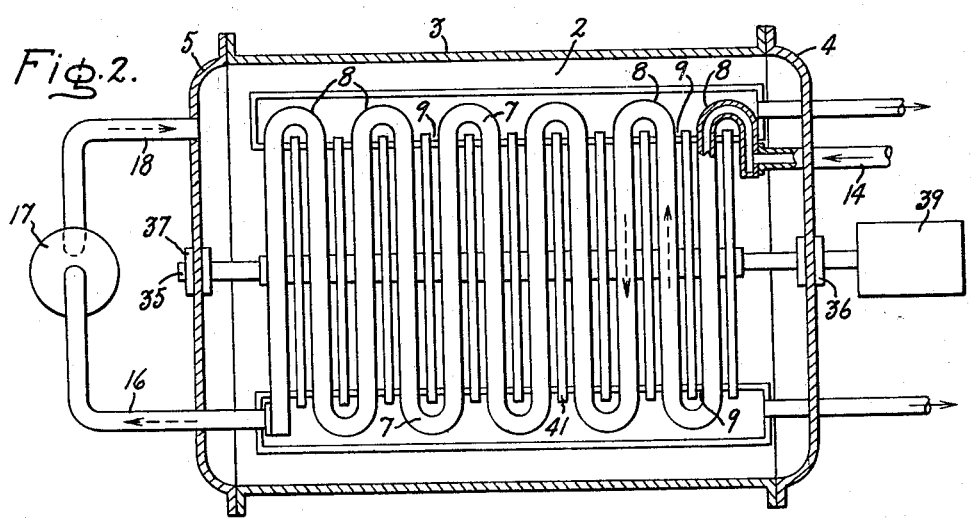
FIGURE 2 is a plan view, partially in section, of the apparatus shown in FIGURE 1.
Figure 3:
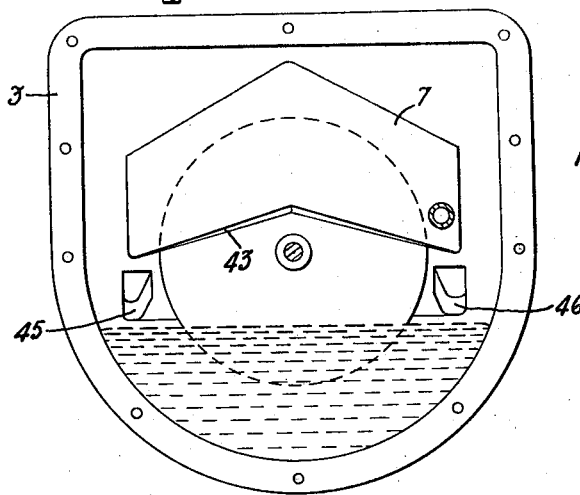
FIGURE 3 is a sectional view taken through line 3—3 in FIGURE 1.

In chamber 2 may be located condenser 7 which is also shown in FIGURES 2 and 3. From FIGURE 2 it is noted that the condenser includes passage 15 extending therethrough having a general serpentine shape and a plurality of external surfaces 8. Surfaces 8 are parallel to one another and define a plurality of spaces 9 to be utilized for a purpose more fully described hereinafter. Distilland which is to be concentrated or demineralized is supplied through conduit 12 and valve 13 in desired amounts to conduit 14 connected to condenser 7. As the distilland passes through the condenser, the temperature thereof may be gradually increased by heat exchange until discharged through conduit 16 to an external boiler 17. This boiler may be of any desired type, for example, gas, electrically or heat pump energized. The heated distilland from the boiler 17 is supplied through conduit 18 into the lower portion of chamber 2 which defines a longitudinal sump 19. The distilland supplied from the boiler passes into an area adjacent the distilland being discharged from condenser 7. The passage of the distilland through sump 19 is in general counterflow relation to the distilland which is passing through condenser 7. The portion of the distilland in the sump experiences a temperature decrease by being in heat exchange with the distilland in the condenser. Prior to leaving sump 19, the distilland is in heat exchange relation with the distilland entering the condenser. Distilland which has been previously heated and is discharged from sump 19 is passed through conduit 20 to pump 21. A portion of the concentrated distilland may be discharged through conduit 24 through valve 26 for the purpose of maintaining a low salinity or concentration level in the distilland. The larger portion of the distilland may be recirculated through conduits 23 and 31 to supply conduit 14. If desired, cooler 30 may be utilized to decrease the temperature of the recirculated distilland. In the event that makeup distilland may decrease the temperature of the mixture sufficiently, cooler 30 may be bypassed through conduit 32 and valve 33.

The operation of the apparatus disclosed in FIGURES 1, 2, and 3 is similar to that in my copending application. Heated distilland is supplied into the sump where a portion thereof is placed in contact with disks 41 of rotor 35. Rotor 35 is supported in bearings 36 and 37 mounted in the end members 4 and 5. In this particular embodiment, the rotor construction is connected to low-speed motor 39, shown in FIGURE 2, to rotate disks 41 through sump 19 to pick up a film of heated distilland.

Distilland temperature in condenser 7 may vary as will the temperature of the distilland in the sump. Adjacent discharge conduit 18 distilland temperature is highest and it decreases because of the heat transfer with the distilland in the condenser. Accordingly, the temperature of the distilland adjacent discharge outlet 20 is the lowest temperature of distilland in the sump. This distilland being in heat transfer relation with the distilland initially supplied to condenser 7.

Preferably, the flat surfaces of disks 41 are wettable surfaces so that a thin film forms thereon which is passed into space 9 located between parallel surfaces 8 of condenser 7. As the heated distilland passes into the spaces adjacent surfaces 8 there is a migration of distillate vapor from the surfaces of disks 41 by a diffusion process wherein the distillate is condensed on condensing surfaces 8. The migration of distillate vapor occurs because the driving force for mass transfer is the partial pressure gradient from the hot distilland liquid to the cooler distillate liquid on the condenser surface. The partially evaporated distilland, that is, the distillate vapor, is condensed on the surface as a result of the lower temperature of the surface.

In the end view of condenser 7, shown in FIGURE 3, drops of distillate (condensate) on surfaces 8 may migrate downwardly toward lip 43 which constitutes the lower portion of condenser 7. The condensate may pass outwardly towards troughs 45 and 46 which are connected to distillate supply conduit 47 shown in FIGURE 1. As disclosed in my copending application described above, this heated condensate may be discharged to a suitable water heater which may be utilized in a home for household use.

In its broadest aspects, the present invention contemplates the diffusion of heated distilland through a non-condensible gas. In FIGURE 1, the particular apparatus is vented to the atmosphere through vent 6 and the non-condensible gas is air. However, in its broadest aspects, the present invention also contemplates the use of non-condensible gases, other than air, which may be at various pressures, for example, higher than atmospheric pressure. In FIGURE 4, the broad aspects of the invention are disclosed. Distilland is supplied through conduit 12 through valve 13 in a controlled manner to compensate for the amount of distilland bled from the system or consumed in the distillation process. The distilland is supplied through conduit 14 and at point 50, the distilland temperature is the mixture temperature of the distilland being recirculated from conduit 31 and makeup distilland from conduit 12. As the distilland passes through condenser 7, the distilland temperature is increased by being in heat transfer relationship through the non-condensible gas medium in chamber 2 with the distilland in sump 19. At point 51 the temperature of the distilland has been increased and it is discharged through conduit 16 to boiler 17 where its temperature is further increased prior to reentry into chamber 2 through conduit 18. This distilland is supplied at point 52 which is located substantially adjacent point 51. As the distilland passes through sump 19 from left to right, it is continually in heat transfer relation with the distilland in condenser 7 and this heat transfer takes place through the non-condensible medium located in the chamber. Accordingly, this heat transfer relation causes the temperature of the distilland at point 52 to decrease until it reaches point 53 which is immediately adjacent discharge conduit 20. This heat transfer accounts for the temperature gradients through the sump and through the condenser. The temperature difference of the distilland in the sump accounts for a vapor pressure gradient across the sump with the partial pressure of the vapor being highest adjacent the warmest distilland and the highest vapor pressure for the non-condensible gas being adjacent the cold distilland.

Distillate formed on condenser 7 is collected in trough 45 and discharged through line 47. The use of cooler 30 arises in the event that the mixture of fresh distilland from conduit 12 does not bring the temperature of recirculated distilland to a desired level for condensation to occur in a desired manner within the chamber.

Accordingly, from the description of the operation of the apparatus in FIGURE 4, it can be seen that the present invention is directed to a distillation process and apparatus wherein the distilland being supplied through the condenser is passed in counterflow relation to heated distilland passing through the same chamber. The counterflow relation provides a multi-effect apparatus in a single chamber in a manner differing from conventional multi-effect processes wherein the chambers are compartmented and the distillation takes place in the absence of non-condensible gases, specifically, under vacuum conditions.

FIGURE 5 discloses the cycle practiced in the embodiment shown in FIGURES 1–4 with reference to the utilization of brackish or saline waters as the distilland. FIGURE 5 is a diagram plotting temperature versus the length of unit area of the condenser in the apparatus. Distilland may be supplied at a temperature of approximately 70° F. at point 55 and when mixed with recirculating distilland from sump 19, the mean temperature of the mixture is approximately 90° F. at point 50 (also shown in FIGURE 4). As the distilland passes through condenser 7, the temperature increases as shown by line 56 until point 51, also shown in FIGURE 4, is reached. The temperature of the distilland is increased in boiler 17 along line 57 to point 52 (also shown in FIGURE 4). Point 52 is the initial entrance temperature of distilland to sump 19. The distilland in sump 19 which is in heat transfer relation with the condenser decreases in temperature along line 58 until the condition at point 53 which may be approximately 95° F. is reached. This completes the diffusion process and condensate at a temperature shown by line 60 will be collected in trough 45 along the length of the trough. The distilland which is recirculated has its temperature decreased down line 61 either as a result of mixture with new feed distilland or as a result of the utilization of cooler 30.

In FIGURE 6 there is shown a diagram plotting performance ratio which constitutes the ratio of distillate vapor generated equivalent to the pounds of steam supplied to the unit versus the condenser inlet temperature. It is noted that the condenser size increases with smaller changes in distilland temperature occurring in the condenser. It is also noted that with a 40° F. difference in the condenser, the performance ration may be small and the ratio increases as shown by the 20 and 10 degree change curves. It is also apparent that the performance ratio improves with low condenser inlet temperatures.

FIGURE 7 illustrates a diagram disclosing the relationship between heat rate and the boiler temperature rise. This diagram also illustrates the heat balance of the system. The heat supplied which is shown by curve 65 comprises the heat content of the feed distilland plus the boiler heat in the recirculated distilland. The area between curve 65 and curve 66 is the heat lost to drain through conduit 24. The distillate consumes the heat shown between curves 66 and 67. In the event that the temperature difference in the boiler is greater than approximately 10° F., it is further noted that a cooler must be provided to remove heat in an amount shown by the area between the abscissa and line 67.

The disclosed invention makes use of noncondensible gases as a transfer medium for distillate vapor from the distilland liquid to the condensing surface. A pressure vessel-type apparatus is not utilized nor is the use of an extensive purging system required. Furthermore, the present invention makes use of a novel diffusion still construction including a rotating disk construction and a novel distilland counterflow arrangement. To achieve high performance ratios similar to those achieved in multi-effect evaporation units such as multiple flash units wherein the multi-compartmented unit operates over wide ranges of pressure. The present invention achieves similar affects as multiple effect units in a single chamber and in the presence and in reliance on non-condensible gases.

While I have described a preferred embodiment of my invention, it will be understood that the invention is not limited thereto since it may be otherwise embodied within the scope of the appended claims.

What I claim as new and desire to secure by Letters Patent of the United States is:

1. In a method for distillation of brackish or saline water, the steps comprising:
   supplying distilland as a cooling medium at a temperature of from 70° F. to 115° F. to one end of a condenser located in the upper portion of a distillation chamber, removing distilland from the other end of the condenser,
   heating the distilland removed from the condenser to a temperature below its boiling point at a pressure equivalent to atmospheric pressure or above,
   passing the heated distilland into the lower portion of the distillation chamber containing a non-condensible gas while maintaining the chamber at a pressure sufficient to prevent boiling of the distilland in a counterflow relation to the flow of distilland in said condenser,
   carrying portions of said heated distilland from the lower portion of the distilland chamber to positions adjacent to but spaced from the condensing surface of said condenser whereby a portion of the distilland so carried will evaporate and diffuse through the non-condensible gas to condense on the condensing surfaces, and
   collecting the condensate from the condensing surfaces.

2. In a method for distillation of brackish or saline water, the steps comprising:
   supplying distilland as a cooling medium at a temperature of from 70° F. to 115° F. to one end of a condenser located in the upper portion of a distillation chamber,
   discharging distilland from the other end of the condenser at a higher temperature than that at which it is supplied to the condenser,
   heating the distilland discharged from the condenser to a temperature below its boiling point at a pressure equivalent to atmospheric pressure or above,
   passing the heated distilland into the lower portion of the distillation chamber containing a non-condensible gas while maintaining the chamber at a pressure sufficient to prevent boiling of the distilland,
   carrying a portion of said heated distilland from a position near its entrance into said chamber to a position adjacent to but spaced from the part of the condenser containing the warmest distilland,
   carrying further portions of said heated distilland from positions progressively further removed from its entrance into said chamber to positions adjacent to but spaced from parts of the condenser containing respectively progressively cooler distilland whereby portions of the distilland so carried will evaporate and diffuse through the non-condensible gas to condense on the condensing surface, and
   collecting the condensate from the condenser surface.

3. In a method for distillation of brackish or saline water, the steps comprising:
   supplying distilland as a cooling medium at a temperature of from 70° F. to 115° F. to one end of a condenser located in the upper portion of a distillation chamber containing a non-condensible gas,
   heating the distilland discharged from the other end of the condenser to a temperature below its boiling point at a pressure equivalent to atmospheric or above,
   passing the heated distilland into a sump in the lower portion of the distillation chamber,
   flowing the distilland through the sump in a counterflow relation to the distilland passing through the condenser,
   passing portions of the distilland in the sump in close proximity to the condensing surface whereby portions of the distilland so passed will evaporate diffuse through the non-condensible gas and are condensed on the condenser, and
   recirculating concentrated distilland discharged from the sump through the condenser.

4. A diffusion distillation apparatus comprising:
   a chamber vented to the atmosphere,
   a condenser contained in the upper portion of said chamber defining a generally horizontal serpentine passage for distilland from an inlet near one end of said chamber to an outlet near the opposite end of said chamber,
   means for conveying distilland from the outlet of said condenser to the lower portion of said chamber below said condenser near said opposite end of said chamber,
   means for removing distilland from said chamber near said one end,
   means for carrying portions of the distilland in said chamber from the lower portion to the upper portion to positions adjacent to but spaced from said serpentine condenser passages where diffusion to the surface of said condenser readily occurs, and
   means for collecting condensate formed on said condenser.

5. The diffusion distillation apparatus of claim 4 further having:
   means for conveying a portion of the distilland removed from said chamber to the supply of distilland to said condenser.

6. The diffusion distillation apparatus of claim 5 further having:
   means for cooling the distilland removed from said chamber prior to its entrance into said condenser.

7. A diffusion distillation apparatus comprising:
   a chamber,
   means for admitting a non-condensible gas to said chamber,
   a condenser contained in the upper portion of said chamber defining a generally horizontal serpentine passage for distilland from an inlet near one end of said chamber to an outlet near the opposite end of said chamber, means for heating the distilland discharged from said condenser, means for conveying the heated distilland to the lower portion of said chamber below said condenser near said opposite end of said chamber, means for removing distilland from said chamber near said one end, means for carrying portions of the distilland in said chamber from the lower portion to the upper portion to positions adjacent to but spaced from said serpentine condenser passages where diffusion to the surface of said condenser readily occurs, means for collecting condensate formed on said condenser, means for conveying a portion of the distilland removed from said chamber to the supply of distilland to said condenser, and means for cooling the distilland removed from said chamber prior to its entrance into said condenser.

References Cited by the Examiner
UNITED STATES PATENTS

| | | | |
|---|---|---|---|
| 2,703,310 | 3/1955 | Kritchmar | 202—236 |
| 2,759,882 | 8/1956 | Worthen. | |
| 2,908,618 | 10/1959 | Bethon | 202—174 |
| 2,959,424 | 11/1960 | Goeldner. | |

FOREIGN PATENTS

| | | |
|---|---|---|
| 978,997 | 4/1951 | France. |

NORMAN YUDKOFF, *Primary Examiner.*

GEORGE D. MITCHELL, *Examiner.*

J. B. DONIHEE, M. H. SILVERSTEIN,
*Assistant Examiners.*